United States Patent
Di Censo et al.

(10) Patent No.: US 9,720,510 B2
(45) Date of Patent: Aug. 1, 2017

(54) USER-DIRECTED PERSONAL INFORMATION ASSISTANT

(71) Applicant: HARMAN INTERNATIONAL INDUSTRIES, INC., Stamford, CT (US)

(72) Inventors: Davide Di Censo, San Mateo, CA (US); Stefan Marti, Oakland, CA (US); Jaime Elliot Nahman, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 5 days.

(21) Appl. No.: 14/587,720

(22) Filed: Dec. 31, 2014

(65) Prior Publication Data
US 2015/0193005 A1 Jul. 9, 2015

Related U.S. Application Data (60) Provisional application No. 61/923,553, filed on Jan. 3, 2014.

(51) Int. Cl.
| | | |
|---|---|---|
| G06F 3/01 | (2006.01) | |
| G06T 7/00 | (2017.01) | |
| G06F 3/038 | (2013.01) | |
| G06F 3/16 | (2006.01) | |
| G10L 17/22 | (2013.01) | |
| G06T 7/73 | (2017.01) | |

(52) U.S. Cl.
CPC .............. *G06F 3/017* (2013.01); *G06F 3/013* (2013.01); *G06F 3/038* (2013.01); *G06F 3/167* (2013.01); *G06T 7/73* (2017.01); *G10L 17/22* (2013.01); *G06F 2203/0381* (2013.01)

(58) Field of Classification Search
CPC ........ G06F 3/017; G06F 3/033–3/0386; G06F 3/013; G06F 2203/0381; G06F 3/167; G06K 9/62–9/82; G06T 7/0042; G10L 17/22
See application file for complete search history.

(56) References Cited

U.S. PATENT DOCUMENTS

| | | | | |
|---|---|---|---|---|
| 6,393,136 B1* | 5/2002 | Amir | .......... | G06T 7/004 348/14.01 |
| 6,529,855 B1* | 3/2003 | Gu | .......... | G06K 9/00536 382/190 |
| 9,153,074 B2* | 10/2015 | Zhou | .......... | G06F 1/163 |
| 2002/0182739 A1* | 12/2002 | Sadik | .......... | G01N 30/02 436/106 |

(Continued)

OTHER PUBLICATIONS

Extended European Search Report for Application No. 15150025.3 dated May 19, 2015.

*Primary Examiner* — Larry Sternbane
(74) *Attorney, Agent, or Firm* — Artegis Law Group, LLP (57) ABSTRACT

One embodiment of the present invention sets forth a technique for identifying a characteristic of an object. The technique includes determining that the object is a target of a directional gesture and detecting a trigger event that occurs while the object is the target of the directional gesture. The technique further includes, in response to the trigger event, acquiring sensor data associated with the object via one or more sensors and analyzing the sensor data to identify at least one characteristic of the object.

22 Claims, 9 Drawing Sheets

(56) References Cited

U.S. PATENT DOCUMENTS

| | | | |
|---|---|---|---|
| 2006/0161379 A1 | 7/2006 | Ellenby et al. | |
| 2013/0050258 A1* | 2/2013 | Liu | G06F 17/3087 345/633 |
| 2014/0143785 A1 | 5/2014 | Mistry et al. | |
| 2014/0292653 A1* | 10/2014 | Kamba | G06T 19/006 345/157 |
| 2015/0336588 A1* | 11/2015 | Ebner | G01C 21/3629 701/2 |
| 2016/0026431 A1* | 1/2016 | Yi | G06F 3/165 345/156 |

* cited by examiner

USER-DIRECTED PERSONAL INFORMATION ASSISTANT

CROSS-REFERENCE TO RELATED APPLICATIONS

This application claims benefit of the U.S. provisional patent application having Ser. No. 61/923,553, filed Jan. 3, 2014. The subject matter of this related application is hereby incorporated herein by reference.

BACKGROUND

Field of the Embodiments of the Invention

Embodiments of the present invention generally relate to information retrieval and, more specifically, to a user-directed personal information assistant.

Description of the Related Art

Use of electronic devices, such as personal computers, smartphones, smart watches, etc., is becoming increasingly popular in all aspects of daily life. Such devices provide users with convenient access to databases that include information on a variety of topics. In order to locate specific types of content about an object of interest within those databases, a user may submit a textual query associated with the object of interest to a search engine. Search results for the textual query are then presented to the user, enabling the user to visit different websites in order to locate the website that contains the most relevant information.

One common obstacle confronted by users attempting to locate information about an object of interest is providing an accurate textual description of the object to the search engine. For example, in many situations, a user would like to learn specific information about a particular object that the user has come across, but the user may not be able to accurately identify the object to the search engine (e.g., using an object name or some other type of object identifier). Consequently, in such instances, the user must first determine the identity of the object by describing one or more physical attributes of the object to the search engine. Then, to the extent the object is identified by the search engine, the user might need to perform an additional search to locate a specific type of information about the object. This type of multi-step process, which is common with current search techniques, is tedious and oftentimes produces unsatisfactory results.

As the foregoing illustrates, one or more techniques that enable a user to more effectively acquire information about objects in the user's environment would be useful.

SUMMARY

One embodiment of the present invention sets forth a method for identifying a characteristic of an object. The technique includes determining that the object is a target of a directional gesture and detecting a trigger event that occurs while the object is the target of the directional gesture. The technique further includes, in response to the trigger event, acquiring sensor data associated with the object via one or more sensors and analyzing the sensor data to identify at least one characteristic of the object.

Further embodiments provide, among other things, a system and a non-transitory computer-readable medium configured to implement the method set forth above.

At least one advantage of the various embodiments is that a user is able to acquire specific information about objects located in the user's environment. Additionally, the user is able to acquire information about objects that the user cannot accurately identify, such as objects that do not have an official name, objects that may be referred to by multiple names, and/or objects which are difficult to precisely describe. Further, the disclosed techniques enable the user to acquire information about an object using convenient voice prompts, gestures, and/or other types of triggers.

BRIEF DESCRIPTION OF THE SEVERAL VIEWS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments. However, it will be apparent to one of skill in the art that the embodiments may be practiced without one or more of these specific details.

Figure 1:
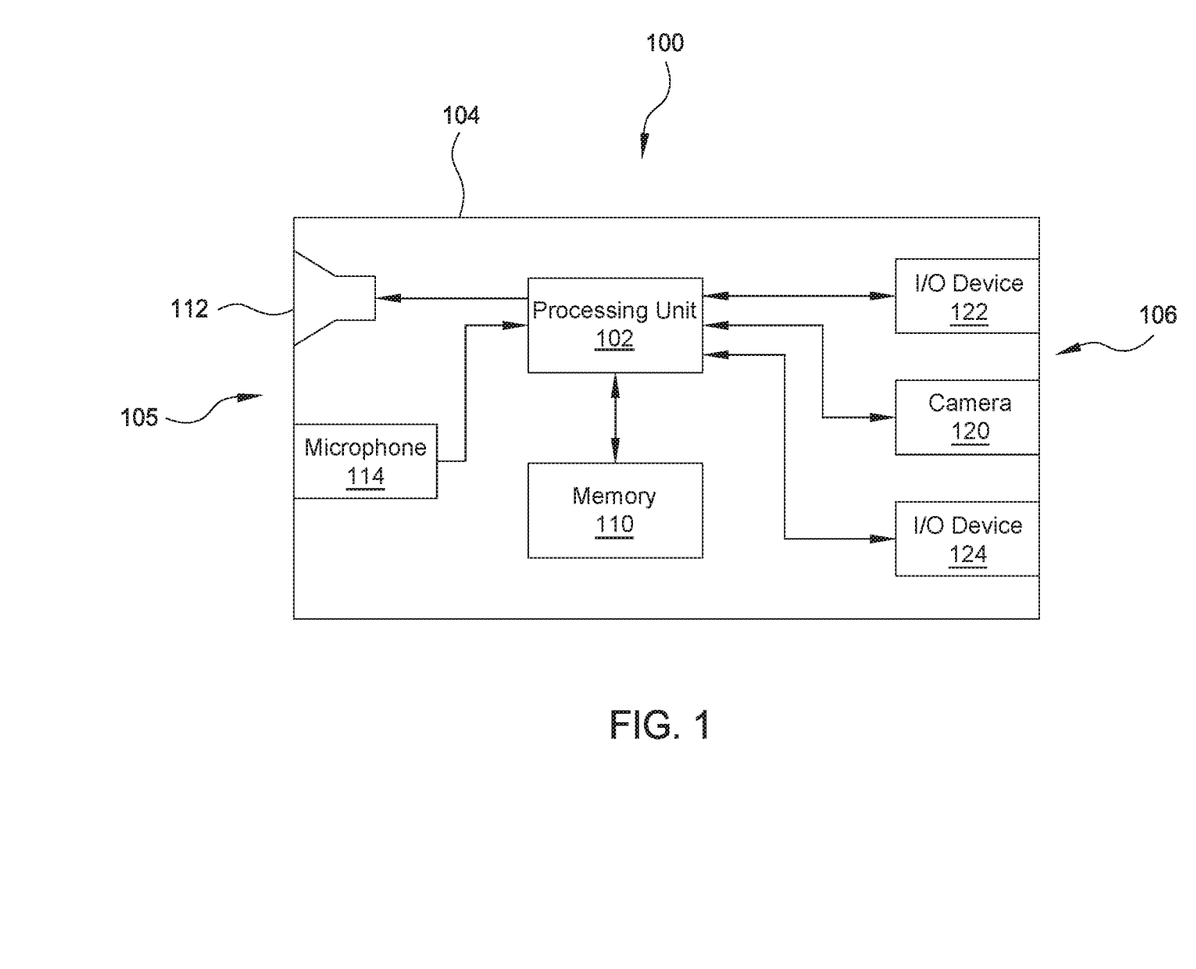
FIG. 1 illustrates an information assistant configured to implement one or aspects of various embodiments.

FIG. 1 illustrates an information assistant 100 configured to implement one or aspects of various embodiments. The information assistant 100 may include, without limitation, a device body 104, a processing unit 102, a memory 110, a speaker 112, a microphone 114, a camera 120, and one or more input/output (I/O) devices (e.g., I/O device 122 and I/O device 124). The device body 104 may include a first side 105 and a second side 106.

The microphone 114 is configured to acquire sound from the surrounding environment and transmit signals associated with the sound to the processing unit 102. For example, and without limitation, the microphone 114 may acquire voice prompts spoken by the user. Consequently, in some embodiments, the microphone 114 is located in a portion of the first side 105 of the device body 104, and the first side 105 faces the user during operation of the information assistant 100. In the same or other embodiments, the microphone 114 may be located in a different portion of the device body 104 and/or one or more additional microphones 114 may be included in portions of the device body 104 (e.g., in a portion of the second side 106 of the device body 104). For example, and without limitation, a microphone 114 may be located in a portion of the second side 106 in order to acquire audio samples from an object of interest.

Additionally, one or more microphones 114 may be physically separate from the device body 104 and coupled to the processing unit 102 via a wired connection or wireless connection. For example, and without limitation, in order to more effectively acquire sound from the surrounding environment, one or more microphones 114 may be positioned on the user's body (e.g., head, arm, hand, etc.) and/or on one or more other devices (e.g., electronic device, vehicle, etc.) the user is operating. Such microphones 114 may then be coupled to the processing unit 102 via a wired connection or wireless connection.

The speaker 112 may be located in a portion of the first side 105 of the device body 104. The speaker 112 is configured to produce sounds based on signals that are generated by the processing unit 102 and/or other signals that are transmitted to the speaker 112. For example, and without limitation, the speaker 112 may output auditory information to the user to describe one or more objects that have been identified by the information assistant 100. In the same or other embodiments, one or more speakers 112 are located in a different portion of the device body 104. In still other embodiments, one or more speakers 112 may be physically separate from the device body 104 and coupled to the processing unit 102 via a wired connection or wireless connection. For example, and without limitation, one or more speakers 112 may be located in a headset worn by the user, in a vehicle or electronic device being operated by the user, and the like.

The camera 120 is configured to capture images of the user's surroundings, such as one or more images of an object of interest. Consequently, the camera 120 may be located in a portion of the device body 104 that enables the camera 120 to capture images from the user's point of view. The camera 120 may be located in a portion of the second side 106 of the device body 104. In some embodiments, the second side 106 of the device body 104 faces away from the user, towards one or more objects of interest, during operation of the information assistant 100. In some embodiments, the camera 210 may be positioned on the user's body (e.g., head, arm, hand, etc.) and/or on one or more other devices (e.g., electronic device, vehicle, etc.) the user is operating, such as on a vehicle in which the user is traveling.

Additionally, in various embodiments, one or more cameras 120 are configured to capture images of the user. For example, and without limitation, a camera 120 may capture images of the user (e.g., the user's face, eyes, body, limbs, etc.) and transmit the images to the processing unit 102. The processing unit 102 then analyzes the images to determine an eye gaze direction of the user, a direction in which the user is pointing, whether a particular gesture (e.g., hand gesture, arm gesture, facial gesture, etc.) is being performed by the user, the positions of the user's arms and/or legs, and the like. Based on the analysis of the images, the processing unit 102 may then determine an object of interest that is being targeted by the user. Further, in some embodiments, the camera 120 identifies gestures and/or determines the position of the user's arms and/or legs.

The I/O devices (e.g., I/O device 122 and I/O device 124) may include one or more types of sensors that enable the information assistant 100 to identify an object of interest and/or determine one or more characteristics of an object of interest. For example, and without limitation, the I/O devices may include one or more image sensors (e.g., a visible light sensor, infrared sensor, etc.), depth sensors, and/or one or more auditory sensors that acquire different types of sensor data including image data, thermal data, depth data, and/or audio samples for analysis by the processing unit 102. In the same or other embodiments, the I/O devices may include one or more radiofrequency (RF) sensors, spectrometers, sensor arrays (e.g., molecular sensors, chemosensors, etc.), tomographic sensors, and the like that acquire other types of sensor data. For example, and without limitation, a RF sensor, spectrometer, sensor array, and/or tomographic sensor may be used to determine the composition of an object by detecting a first type of sensor data (e.g., image data, audio data, etc.) and a second type of sensor data (e.g., an odor profile or vaporized chemical composition, spectroscopic data, electromagnetic energy, tomographic data, etc.). The composition of the object may then be compared to reference compositions stored in a remote database or local database in order to identify the object based on one or more type(s) of sensor data.

In some embodiments, the I/O devices may include one or more motion sensors, accelerometers, compasses, global positioning system (GPS) receivers, gyroscopes, physiological sensors, electroencephalography (EEG), electromyography (EMG), electrocardiography (ECG), etc. that are configured to detect movement, location, and/or orientation of the information assistant 100. In the same or other embodiments, these types of I/O devices may be used to detect user gestures and/or trigger detection of a gesture or object of interest, as described below in further detail in conjunction with FIG. 2A. Additionally, in some embodiments, the I/O devices may be used to determine which object, if any, is being targeted by the user. For example, and without limitation, a GPS receiver may be used to determine the location of the user, and a compass and/or gyroscope may be used to determine the direction in which the information assistant 100 is pointing (e.g., the direction in which the user is pointing the information assistant 100). The GPS location and the direction may then be used to determine the object of interest that is being targeted by the user, as described in further detail in conjunction with FIG. 7.

In some embodiments, the I/O devices include one or more communication devices, such as RF communication devices, (e.g., 802.11x devices, Bluetooth® modules, cellular radios, etc.), near-field communication (NFC) tags, NFC readers, infrared communication devices, and the like. The communication device(s) may be configured to transmit information to and/or receive information from microphones 114, speakers 112, cameras 120, and/or other I/O devices. Additionally, the communication device(s) may be configured to retrieve information from and/or store information in a remote database (e.g., via a local area connection and/or the Internet).

The processing unit 102 is configured to receive signals from the microphone 114, the camera 120, and the one or more input/output (I/O) devices and process the signals, either alone or in combination, in order to determine the identity and/or characteristics of an object of interest. In some embodiments, the processing unit 102 is further configured to transmit signals to the speaker 112 and/or a display to inform the user of the identity of the object of interest and/or of one or more characteristics of the object of interest. In the same or other embodiments, the processing unit 102 is further configured to transmit signals to one or more I/O devices to inform the user of the identity of the object of interest and/or of one or more characteristics of the object of interest. For example, and without limitation, the processing unit 102 may transmit signals to a Bluetooth® module in order to provide auditory, visual, or haptic information to a Bluetooth® device being operated by the user.

The memory 110 may store one or more applications that are executed by the processing unit 102 to perform analysis on data received from the microphone 114, the camera 120, and the one or more input/output (I/O) devices. Additionally, in some embodiments, the memory 110 stores a database that includes reference information (e.g., image data, spectral data, look-up tables, audio data, geographical data, language models, etc.) to which data received from the microphone 114, the camera 120, and the one or more input/output (I/O) devices can be compared to determine the identity and/or characteristics of an object of interest.

Figure 2A:
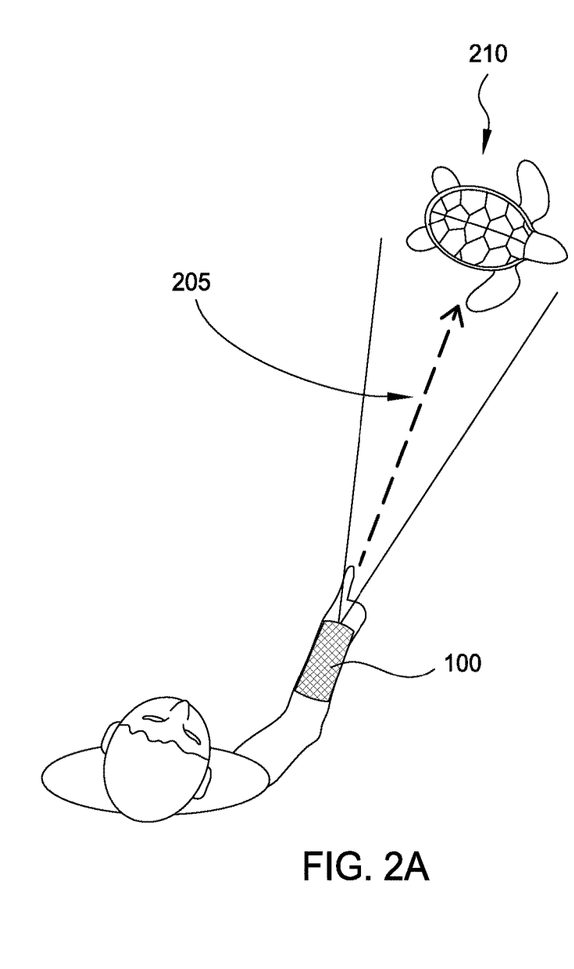
FIGS. 2A and 2B illustrate a technique for operating the information assistant of FIG. 1, according to various embodiments.
Figure 2B:
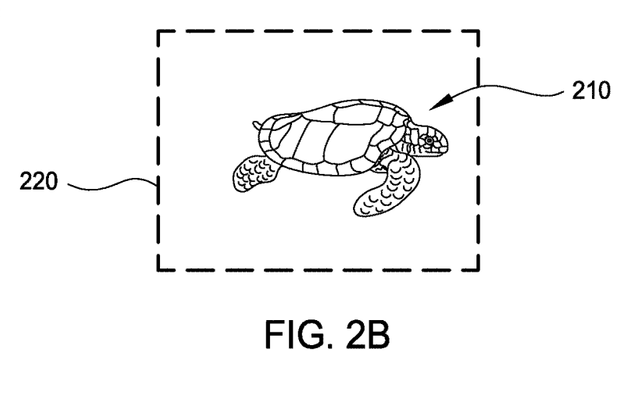

FIGS. 2A and 2B illustrate a technique for operating the information assistant 100 of FIG. 1, according to various embodiments. As shown, in some embodiments, the information assistant 100 may be attached to the user in a manner the enables the user to direct the information assistant 100 towards an object of interest 210. For example, and without limitation, the information assistant 100 may be attached to the user's arm and/or hand, allowing the user to target an object of interest 210 for identification and/or characterization by the information assistant 100 by pointing at the object of interest 210. Additionally, in some embodiments, the information assistant 100 (and/or one or more components of the information assistant 100) may be attached to other parts of the user, such as the user's head, shoulders, torso, etc.

In various embodiments, the user may perform multi-modal actions to interact with the information assistant 100. In some embodiments, the multi-modal actions include a directional gesture and a trigger event. For example, and without limitation, as shown in FIG. 2A, the user may perform a directional gesture by pointing or looking at an object of interest 210 and/or by pointing the information assistant 100 at the object of interest 210. The user may then verbally trigger the information assistant 100 by speaking a voice prompt to the information assistant 100 via the microphone 114, such as by asking, "what is that" or "what type of turtle is that?" In response, the information assistant 100 determines which object is being targeted by the user (e.g., based on the direction of the user's arm or eye gaze) and analyzes data received from the camera 120 and/or one or more I/O devices (e.g., image data, sound data, sensory data, etc. received from I/O device 122 and/or I/O device 124) to identify and/or characterize the object 210. Additionally, the type of information provided to the user may depend on the voice prompt. For example, and without limitation, the information assistant 100 may analyze the voice prompt to determine the specific type of information requested by the user (e.g., the species of turtle). The information assistant 100 may then provide information about the object of interest 210 to the user via the speaker 112, an I/O device, a display, etc.

In the same or other embodiments, the directional gesture may include any manner of indicating the object of interest 210 that is to be analyzed by the information assistant 100. Examples of directional gestures include, without limitation, hand gestures, limb gestures, eye gaze gestures, and gestures with objects, such as the information assistant 100, sensors, pointing devices, etc. As described above, the information assistant 100 may detect directional gestures using a camera 120 or I/O device included in the device body 104. In the same or other embodiments, the information assistant 100 may detect directional gestures using a camera 120 or I/O device that is separate from the device body 104 and coupled to the information assistant 100 via a wired or wireless connection. For example, and without limitation, the information assistant 100 may detect eye gaze gestures via an eye gaze sensor that is mounted on the user's head (e.g., a head-mounted display, headphones, etc.) or body and/or via an environment-mounted eye gaze sensor that is facing, but not directly attached to, the user (e.g., a Tobii® eye gaze detection system). Additional examples of directional gesture detection sensors are described in conjunction with FIGS. 5A-7.

Trigger events that are recognized by the information assistant 100 may include, without limitation, voice prompts, motion-based trigger events, time-based trigger events, input device trigger events, implicit trigger events, and the like. For example, and without limitation, a voice prompt may include a verbal query (e.g., "what is X?" or "what type of X is that?") and/or a voice command (e.g., "analyze X" or "search for X"). In some embodiments, motion-based trigger events include, without limitation, movement (e.g., rotation, tapping, shaking, etc.) of the information assistant 100 or of an I/O device coupled to the information assistant 100. Time-based trigger events may include performing any directional gesture for a specified period of time. For example, and without limitation, the user may perform and hold a hand gesture, limb gesture, eye gaze gesture, etc. for a specified period of time to trigger the information assistant 100 to identify and/or characterize and object of interest 210 being targeted by the directional gesture.

Input device trigger events may include, without limitation, pressing a button on or associated with the information assistant 100 and/or interacting with an I/O device coupled to the information assistant 100 in a manner intended to trigger the information assistant to identify and/or characterize an object of interest 210. Implicit trigger events may include, without limitation, criteria that indicate interest by the user in a particular object the user is currently looking at or pointing too. In some embodiments, such criteria include changes to the user's physiological state, such as pupil dilation or heart rate. For example, and without limitation, the user may trigger the information assistant 100 when his or her pupils dilate and/or when the user's heart rate increases.

Further, in some embodiments, a voice prompt may modify a directional gesture or may be used in place of a directional gesture to target an object of interest 210. For example, and without limitation, if a user speaks the directional voice prompt "what type of car is to my right?" the information assistant 100 may detect the current directional gesture (e.g., the direction of the user's body position and/or eye gaze) and analyze data associated with an object that is to the right of the directional gesture.

Once the information assistant 100 determines that a multi-modal action (e.g., a directional gesture and a trigger event) has been received, the information assistant 100 isolates data (e.g., color data, depth data, spectroscopic data, audio data, etc.) associated with the object of interest 210 from other data in the surrounding environment that is unrelated to the object of interest 210. For example, and without limitation, as shown in FIG. 2B, in embodiments where the information assistant 100 includes a camera 120, the directional gesture may be used to capture one or more images of an object of interest 210 (e.g., mechanically with a pan-tilt mechanism or via post-processing) and/or analyze one or more images to visually isolate the object of interest 210.

Isolating the object of interest 210 may include any effective manner of image processing, including, without limitation, cropping an image, performing edge detection on objects included in an image, applying an object recognition algorithm to an image, comparing an image to one or more images included in a database, and the like. For example, and without limitation, the processing unit 102 (or a remote server in communication with the information assistant 100) may analyze an image acquired by the camera 120 to perform scene analysis. In some embodiments, scene analysis includes determining which portions of the image include the object of interest 210 and which portions are unrelated to the object of interest 210. The portions of the image relating to the object of interest 210 may then be compared to data stored in a database to determine that the object of interest 210 is a turtle and/or to determine the species of the turtle. Information about the object of interest 210 may then be communicated to the user by the information assistant 100. In the same or other embodiments, multiple objects included in one or more images acquired by the camera 120 and/or I/O devices may be detected, and the directional gesture and/or trigger event may be used to isolate the object of interest 210 that is being targeted by the user. The object of interest 210 is then analyzed by the information assistant 100.

In some embodiments, data received from the camera 120 and/or the I/O devices is analyzed by comparing the data to data stored in a database. Additionally, the processing unit 102 may apply one or more algorithms to the data before and/or after comparing the data to data included in a database. As described above, various types of data processing techniques may be used to determine the identity and/or characteristics of an object of interest 210, for example, and without limitation, image recognition techniques, auditory techniques, spectroscopic techniques, geographical techniques, etc. Further, any of the data analysis techniques described herein may be combined to identity and/or characterize an object of interest 210. In some embodiments, data acquired by the information assistant 100 is transmitted to a remote server and analyzed remotely. The results of the analysis are then transmitted back to the information assistant 100 and provided to the user.

In various embodiments, once the object of interest 210 is identified as a specific object (e.g., the Golden Gate Bridge) or as a generic object (e.g., an oak tree or French fries), the information assistant 100 will look up information associated with the identified object. The information assistant 100 may acquire such information from local sources (e.g., a local knowledge base, a local copy of Wikipedia®, etc.) and/or from a remote server (e.g., Wikipedia®, Google®, Wolfram Alpha®, etc.). Additionally, the information assistant 100 may access specific databases based on the type of object that is identified. For example, and without limitation, if the object of interest 210 is a leaf or tree, then the information assistant 100 may access a database of known leaves, plants, and trees (e.g., LeafSnap™).

In some embodiments, the information assistant may learn where objects of interest 210 are situated in the user's environment and remember the location(s) of those objects in the future to enable more efficient recognition for the original user or another user. For example, and without limitation, if the information assistant 100 is implemented for an indoor setting, the information assistant 100 may learn where the user's furniture is located and, after an initial training phase, may recognize the furniture based on the stored location(s).

If the information assistant 100 does not recognize an object of interest 210, a user may train the information assistant 100 to recognize the object of interest 210. This information may then be stored locally or remotely (e.g., in cloud storage) to enable the information to be later accessed by the user and/or by other users of information assistants 100. Accordingly, the information assistant 100 may learn from other users' interactions with an information assistant 100 via a remote server, enabling the information assistant 100 to utilize the "collective intelligence" of a community.

Figure 3:
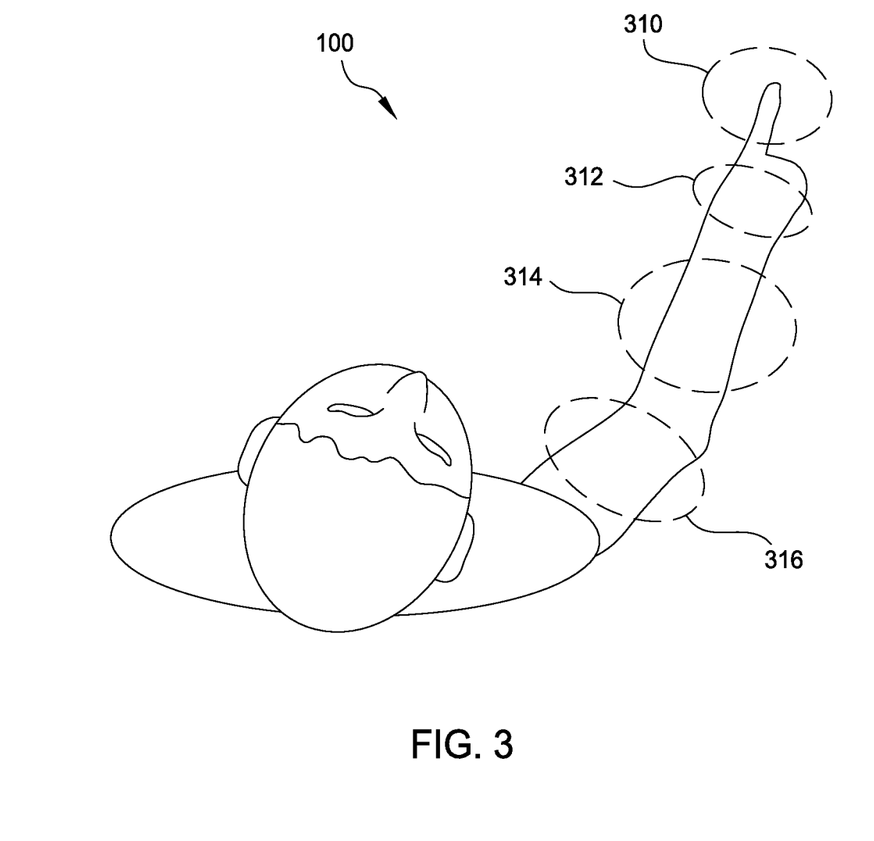
FIG. 3 illustrates locations at which different components of the information assistant of FIG. 1 may be attached to a user, according to various embodiments.

FIG. 3 illustrates locations at which different components of the information assistant 100 of FIG. 1 may be attached to a user, according to various embodiments. As shown, one or more components of the information assistant 100 may be attached to a user's hand/fingers 310, wrist 312, forearm 314, and/or upper arm/shoulder 316. For example, and without limitation, the device body 104 of the information assistant 100 may be attached to the user's forearm 314 (as shown in FIG. 2A), such that the user is able to point the information assistant 100 in the direction of the object of interest 210. However, in the same or other embodiments, any of the cameras 120, microphones 114, and/or I/O devices (e.g., RF sensors, spectrometers, sensor arrays, tomographic sensors, etc.) may be coupled to the user's hand/fingers 310, wrist 312, and/or upper arm/shoulder 316. In some embodiments, one or more I/O devices are coupled to a user's finger nail(s) and optionally use the body's electric field as a power source and/or a communication channel. In other embodiments, an I/O device may be included in a thimble that is placed on the user's finger, such as for performing proximity sensing.

In some embodiments, a camera 120, microphone 114, and/or I/O device may be coupled to the user's hand/fingers 310 to enable the user to collect data in close proximity and/or contact with the object of interest 210. For example, and without limitation, a user may use an I/O device (e.g., sensor array, spectrometer, tomographic sensor) coupled to the user's finger to collect data from a food item the user would like to identify or characterize. The user may then use a voice prompt such as "what type of food is this?" or "is this vegetarian?" to cause (e.g., trigger) the information assistant 100 to analyze the object of interest 210 being targeted by the user. In response to the directional gesture and trigger event, the information assistant 100 acquires data from the I/O device(s), camera(s), etc. and causes the data to be processed locally and/or remotely to determine the identity and/or characteristics of the food. Once processing is complete, the information assistant 100 may then respond by indicating, for example, and without limitation, the type of food, ingredients included in the food, and/or whether the food is vegetarian. In some embodiments, this type of detailed analysis is performed by referencing data received from other users that have acquired data from the same or similar types of objects of interest. For example, and without limitation, when enough users acquire data from a certain type of food, data associated with that type of food may be stored in a collaborative database and referenced by the information assistant 100 to determine that the user has targeted an object of interest 210 that includes ingredients that are the same or similar to those included in the archived food item.

In the same or other embodiments, any of the components of the information assistant 100 described above may be attached to the user's wrist 312 and/or upper arm/shoulder 316. For example, and without limitation, a camera 120 may be attached to the user's upper arm/shoulder 316 to track movement of the user's arm and the object of interest 210 that is being targeted by the user (e.g., via finger pointing). Additionally, an I/O device may be attached to the user's wrist 312, another I/O device may be attached to the user's upper arm/shoulder 316, and the position of the I/O devices relative to one another may be used to detect directional gestures and/or trigger events as described below in conjunction with FIGS. 4A and 4B.

Figure 4A:
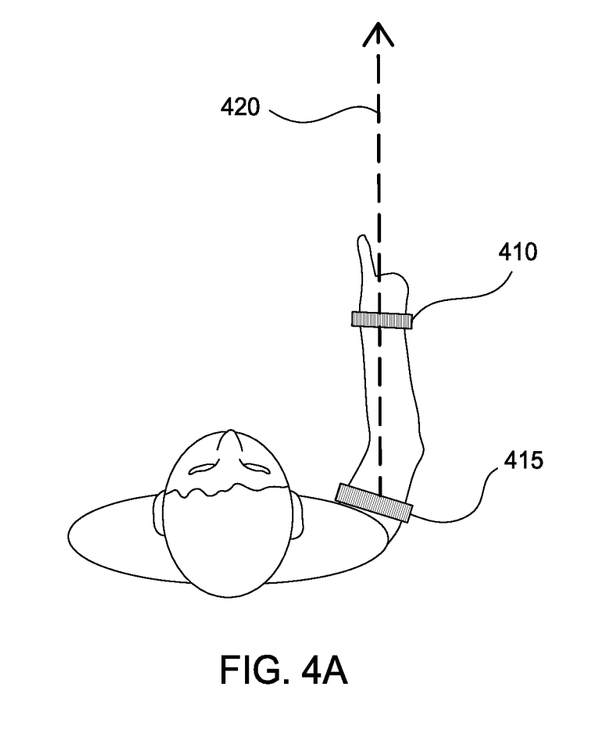
FIGS. 4A and 4B illustrate a technique for detecting directional gestures and/or trigger events based on I/O devices attached to an arm of a user, according to various embodiments.
Figure 4B:
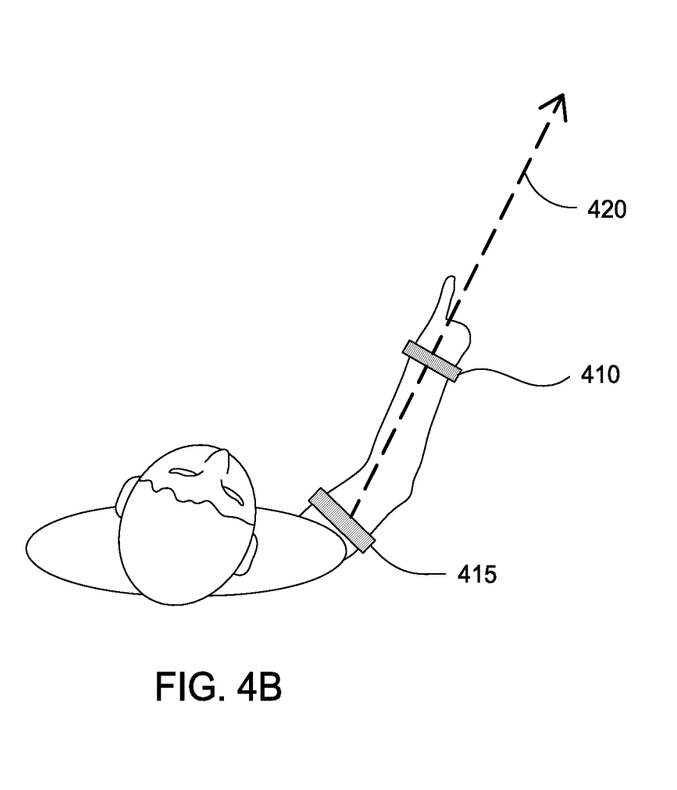

FIGS. 4A and 4B illustrate a technique for detecting directional gestures and/or trigger events based on I/O devices attached to an arm of a user, according to various embodiments. As shown, two or more I/O devices may be attached to the user (e.g., the user's wrist 312 and the user's upper arm/shoulder 316). The relative positions of the I/O devices may then be used to detect directional gestures and/or trigger events performed by the user. For example, and without limitation, the location of an I/O device 410 located on the user's wrist 312 may be determined relative to an I/O device 415 the user's upper arm/shoulder 316 to determine a direction 420 in which the user is pointing. Additionally, the absolute position(s) (e.g., geolocation) of one or more of the I/O devices 410, 415 may be used to determine directional gestures performed by user. In various embodiments, the I/O devices may include infrared, RF, visible light, and/or other types of sensors that use techniques (e.g., triangulation, trilateration, etc.) to determine the relative position, in two dimension or three dimensions, of an user's limb relative to the rest of the user's body. Additionally, in some embodiments, the I/O devices may be mounted on finger rings, smart watches, wrist bands, finger nails, and the like. Further, the I/O devices may use accelerometers, gyroscopes, electrodes, and other types of sensors that measure the acceleration and speed of the user's limbs and/or activity of the user's muscles to determine the location of the limbs, hands, and/or fingers (e.g., Myo™ by Thalmic Labs™) Once the location of the user's hand/fingers 310, wrist 312, forearm 314, and/or upper arm/shoulder 316 relative to the user's body is determined, the information assistant may generate a two-dimensional or three-dimensional vector (e.g., direction 420), which may be transmitted to or otherwise processed by the information assistant 100 as a directional gesture.

Figures 5A, 5B:
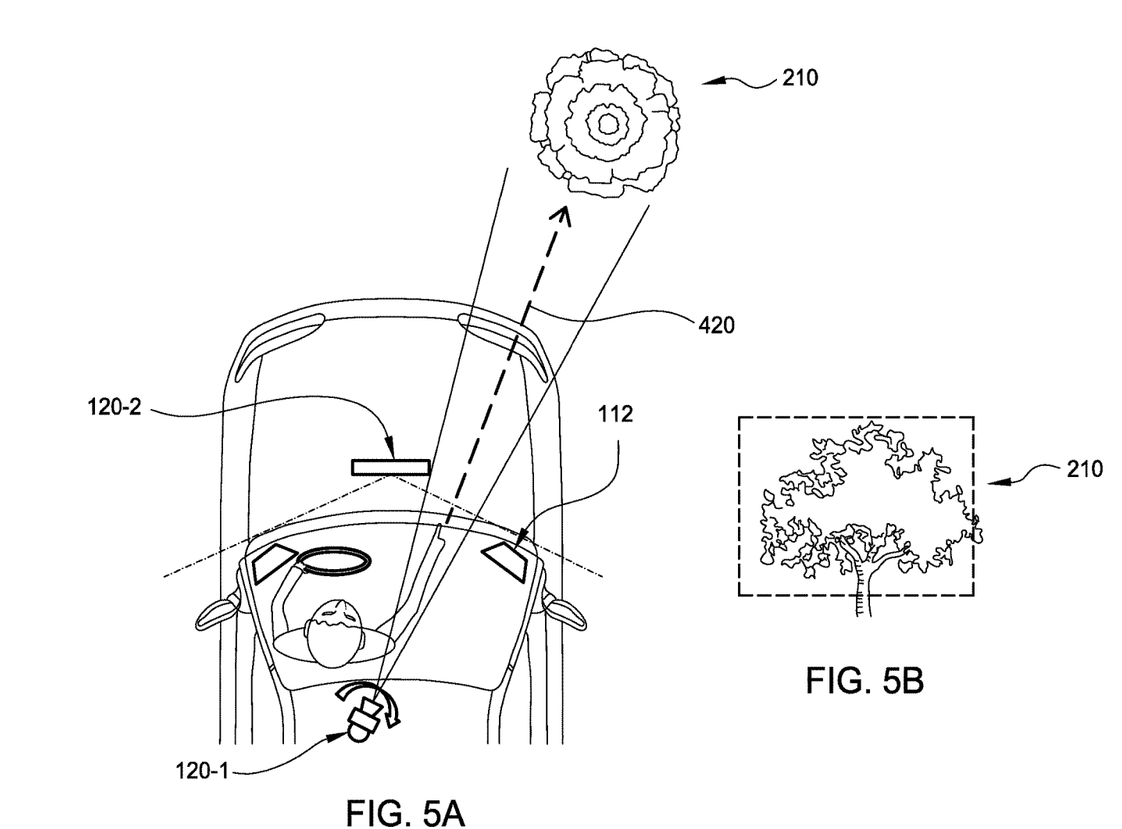
FIGS. 5A and 5B illustrate a technique for detecting directional gestures and/or trigger events with the information assistant of FIG. 1 implemented in an automotive environment, according to various embodiments.
Figure 6A:
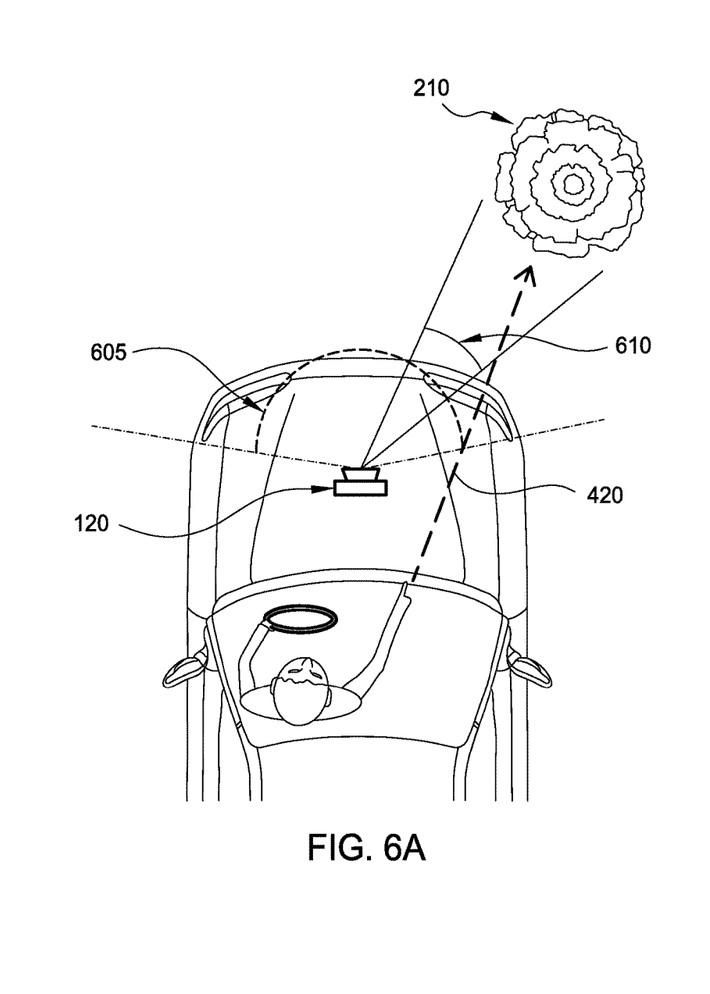
FIGS. 6A-6D illustrate a technique for determining an object of interest being targeted by a user of the information assistant of FIG. 1 implemented in an automotive environment, according to various embodiments.
Figure 6B:
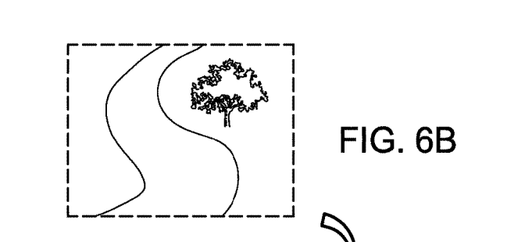
Figure 6C:
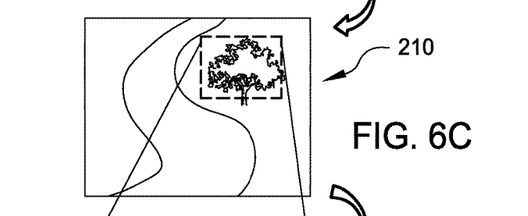
Figure 6D:
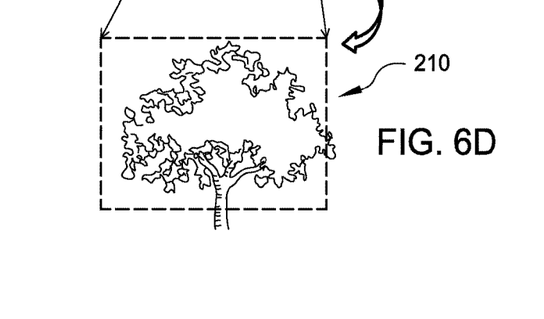

FIGS. 5A and 5B illustrate a technique for detecting directional gestures and/or trigger events with the information assistant 100 of FIG. 1 implemented in an automotive environment, according to various embodiments. As described above, one or more components of the information assistant 100 may be separate from a device body 104 of the information assistant 100. For example, and without limitation, as shown, a camera 120-1 (or other type of I/O device) may be disposed on a roof of an automobile and/or within an automotive cabin, behind the user, in order to capture directional gestures, trigger events performed by the user, and/or images of an object of interest. Additionally, in some embodiments, a user-facing camera 120-2 (or other type of I/O device) is coupled to the information assistant 100 to detect directional gestures (e.g., arm pointing, eye gaze direction, etc.) and/or trigger events performed by the user. One or both of the camera 120-1 and camera 120-2 may include any type of sensor described above, such as image sensors, depth sensors, infrared sensors, etc. Further, one or both of the camera 120-1 and camera 120-2 may be a pan and tilt camera that is able to pan left and right as well as tilt up and down.

Information about the object of interest 210 (e.g., a tree in FIGS. 5A and 5B) may be provided to the user via speakers 112 that are located in the automotive cabin. Further, although not shown in FIG. 5A, one or more microphones 114 may be included in the automotive environment to acquire voice prompts spoken by the user and/or to acquire audio samples from the environment to assist in analyzing an object of interest 210.

FIGS. 6A-6D illustrate a technique for determining an object of interest 210 being targeted by a user of the information assistant 100 of FIG. 1 implemented in an automotive environment, according to various embodiments. As shown, the information assistant 100 may include a camera 120 or other type of I/O device that faces the user's environment and captures images of potential objects of interest 210. In some embodiments, the camera 120 is a wide-angle camera that captures images using an angle-of-view 605 of at least 90° and, in some embodiments, an angle-of-view 605 of at least 120° or up to a full 360° view. An object of interest 210 included in the wide-angle images is then isolated using the direction 420 of a directional gesture performed by the user.

In various embodiments, the direction 420 is used to determine a sub-angle 610 (e.g., the rectangular area around the tree shown in FIG. 6C) of the angle-of-view 605. Then, one or more wide-angle images may be processed to isolate an object of interest 210 that is located within the sub-angle 610 (e.g., resulting in the image shown in FIG. 6D). The processed image(s) (e.g., FIG. 6D) (including the isolated object of interest 210) is/are then analyzed to identify and/or characterize the object of interest 210. In some embodiments, the direction 420 of the directional gesture is determined using one or more of the techniques described above in conjunction with FIGS. 1-5A. Additionally, the processed image(s) of the object of interest 210 may be analyzed using one or more of the data analysis techniques described above in conjunction with FIGS. 1-5A.

Figure 7:
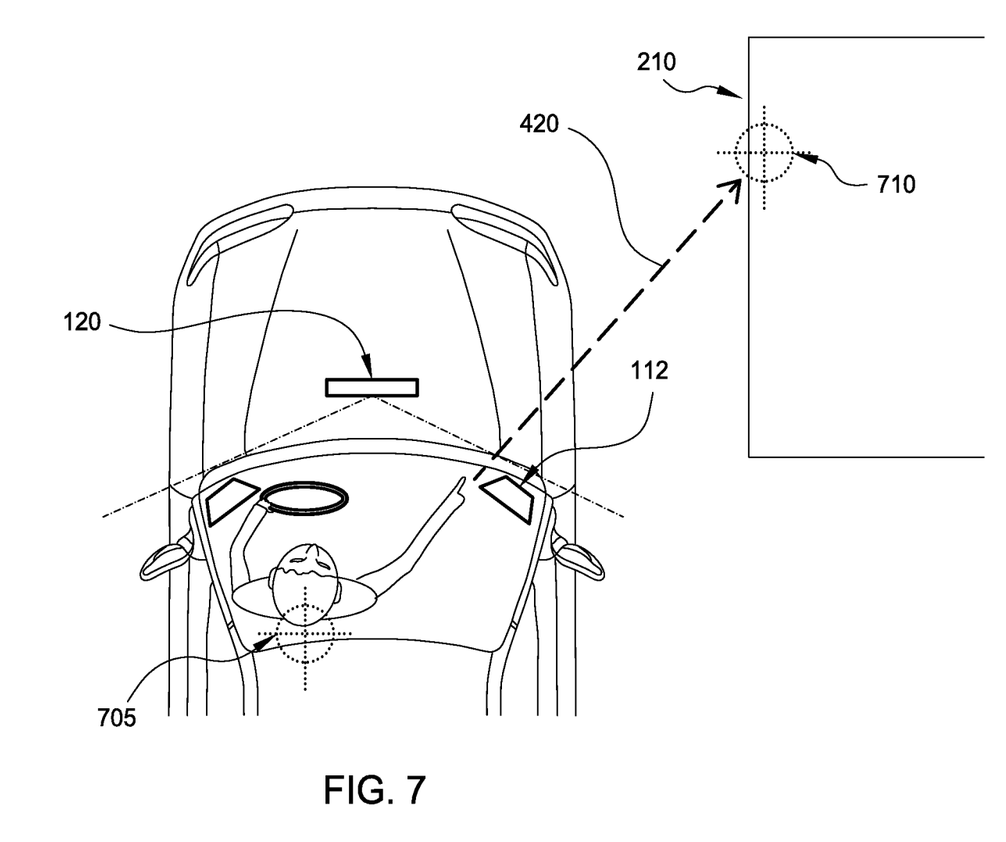
FIG. 7 illustrates a technique for determining an object of interest being targeted by a user based on a global positioning system (GPS) device coupled to the information assistant of FIG. 1, according to various embodiments.

FIG. 7 illustrates a technique for determining an object of interest 210 being targeted by a user based on a global positioning system (GPS) device coupled to the information assistant 100 of FIG. 1, according to various embodiments. As described above, the information assistant 100 may include a GPS receiver configured to detect the location of the user 705. Then, once the location of the user 705 and the direction 420 of the object of interest 210 relative to the user have been determined, the location of the object of interest 710 can be determined.

In some embodiments, once the location of the user 705 is determined, a vector is extended from the location of the user 705 in the direction 420 of the directional gesture. Then, the vector may be cross-referenced with geographical data (e.g., map data, such as Google® Maps or Google® Street View) to determine the identity of the object of interest 210 (e.g., a house or landmark). Additionally, once the identity of the object of interest 210 is determined, the information assistant 100 may acquire additional information about the object of interest 210 and provide the additional information to the user. In the same or other embodiments, once the location of the user 705 is determined, the information assistant 100 may acquire cached images of the surrounding area (e.g., via Google® Street View) associated with the location 705 and analyze the images based on the direction 420 to identify an object of interest 210. For example, and without limitation, once the location of the user 705 is determined, the direction 420 may be used to determine which image orientation(s) will be analyzed to identify the object of interest 210.

In general, although the components of the information assistant 100 shown in FIGS. 5A-7 are separate from the device body 104, these components may be configured to detect directional gestures and trigger events, transmit data to the processing unit 102, and/or provide information about an object of interest 210 to the user in a substantially similar manner as described above in conjunction with FIGS. 1-4B. Thus, any aspects of the techniques shown in FIGS. 5A-7 may be combined with any aspects of the techniques described above in conjunction with FIGS. 1-4B to identify and/or characterize an object of interest 210.

Figure 8:
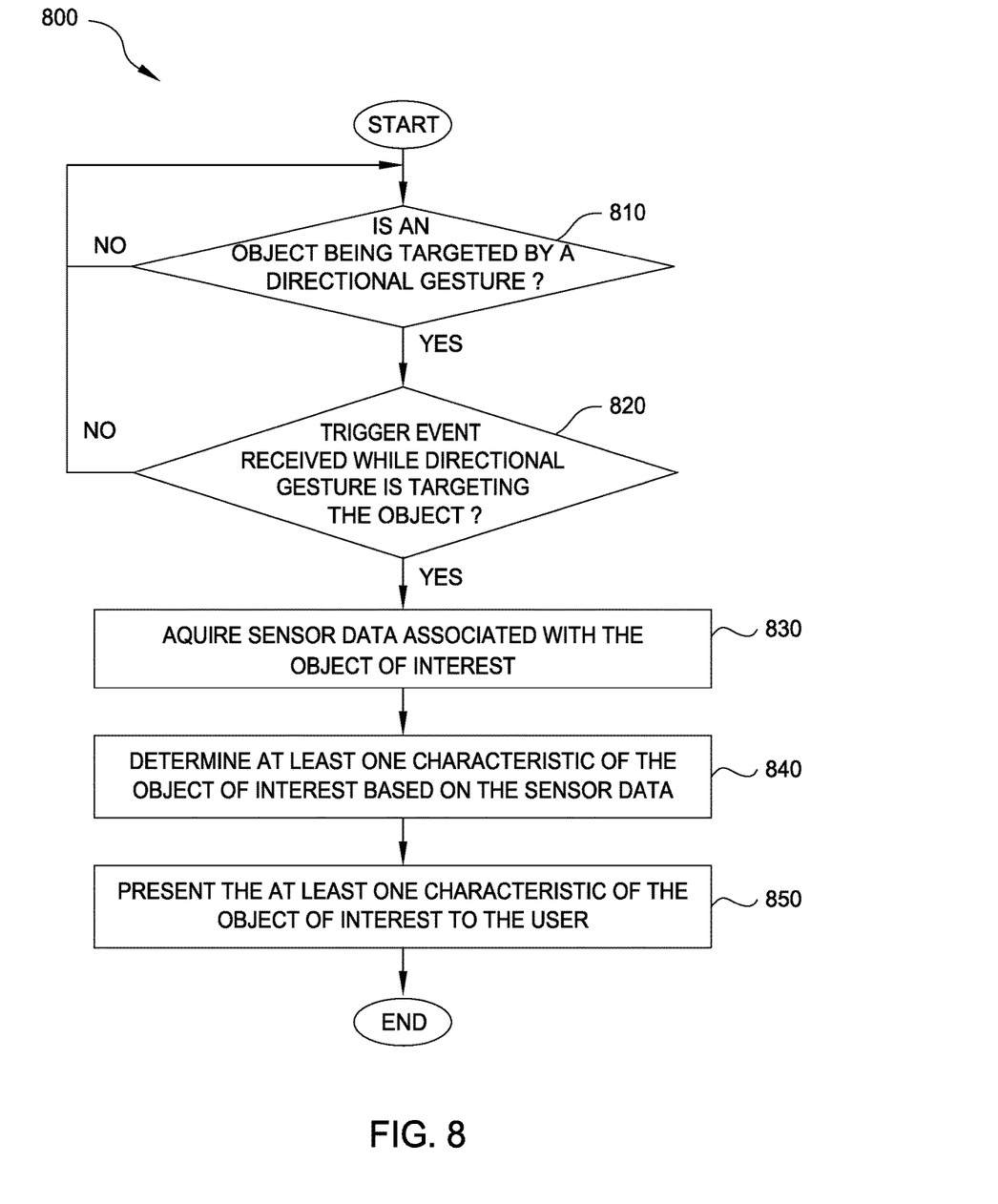
FIG. 8 is a flow diagram of method steps for identifying a characteristic of an object that is being targeted by a directional gesture via an information assistant, according to various embodiments, according to various embodiments.

FIG. 8 is a flow diagram of method steps for identifying a characteristic of an object that is being targeted by a directional gesture via an information assistant 100, according to various embodiments. Although the method steps are described in conjunction with the systems of FIGS. 1-7, persons skilled in the art will understand that any system configured to perform the method steps, in any order, falls within the scope of the present invention.

As shown, a method 800 begins at step 810, where the processing unit 102 determines whether an object 210 is being targeted by a directional gesture. An object of interest 210 may be targeted by a directional gesture using any of the techniques described above. For example, and without limitation, in some embodiments, the processing unit 102 analyzes sensor data (e.g., image data and/or depth data) received via one or more I/O devices to determine whether a directional gesture (e.g., hand/arm pointing, eye gaze, voice prompt, etc.) performed by a user intersects an object in the surrounding environment. In some embodiments, the voice prompt includes a directional gesture (e.g., a directional voice prompt), such as by prompting the information assistant 100 to identify an object that is to the right/left of the user, to a compass direction (e.g., north, east, south, west) relative to the user, at an angular position relative to the user (e.g., 70° relative to the direction in which is user is facing), at a clockwise position relative to the user (e.g., at the user's 2 o'clock), and the like. In the same or other embodiments, the processing unit 102 may analyze acceleration and/or orientation data received via one or more I/O devices to determine that the information assistant 100 is being pointed at an object 210 and/or that a portion of the user's body is being pointed at an object 210. For example, and without limitation, an accelerometer and/or gyroscope may determine that the information assistant 100 has been moved from a first position (e.g., at the user's side, facing the ground) to a second position (e.g., pointed out in front of the user, facing a direction that is substantially parallel to the ground). Accordingly, in various embodiments, the processing unit 102 may determine that an object 210 is being targeted by a directional gesture—and may also determine directional data associated with the directional gesture—when a user points at an object 210, looks at an object 210, points the information assistant 100 at an object 210, speaks a voice prompt, and the like.

If the processing unit 102 determines that a directional gesture is targeting an object of interest 210, then the method proceeds to step 820. If an object of interest 210 is not being targeted by a directional gesture, then the processing unit 102 continues to monitor for a directional gesture.

Next, at step 820, the processing unit 102 determines whether a trigger event is received while the object 210 is being targeted by the directional gesture. As described above, trigger events that are recognized by the information assistant 100 may include, without limitation, voice prompts, motion-based trigger events, time-based trigger events, input device trigger events, implicit trigger events, and the like. In some embodiments, a trigger event is detected via sensor data (e.g., image data, audio samples, accelerometer data, gyroscopic data, and the like) received from one or more I/O devices (e.g., from EMG and muscle activity sensors), as described above. For example, and without limitation, a motion-based trigger may be detected by analyzing, via the processing unit 102, one or more images acquired via the camera 120 to determine that the user has winked, performed a hand/arm gesture, and the like. In the same or other embodiments, a motion-based trigger may be detected by analyzing data received from an accelerometer and/or gyroscope to determine that the information assistant 100 has been moved (e.g., rotated, lifted, shook, etc.) in a particular manner. Additionally, in some embodiments, a voice prompt may serve as both a directional gesture that is targeting an object of interest 210, as described above, as well as a trigger event indicating that information is to be acquired for the object of interest 210.

In addition, a time-based trigger event may be detected by analyzing data received via a camera 120, microphone 114, and/or one or more I/O devices to determine that an object 210 has been targeted by a directional gesture for a specified period of time (e.g., 1 to 3 seconds). For example, and without limitation, the processing unit 102 may determine that a hand gesture, limb gesture, eye gaze gesture, etc. has been targeting an object 210 for a specified period of time.

If a trigger event is received while the object 210 is being targeted by the directional gesture, then the method 800 proceeds to step 830. If no trigger event is received while the object 210 is being targeted by the directional gesture, then the method 800 returns to step 810.

Alternatively, in some embodiments, the order of step 810 and step 820 may be reversed such that step 820 is performed before step 810. For example, and without limitation, at step 820, the processing unit 102 may first determine whether a trigger event has been received. If a trigger event is not received, then the processing unit 102 may continue to monitor for a trigger event. If a trigger event is received, the method 800 may then proceed to step 810, where the processing unit 102 next determines an object of interest 210 that is being targeted by a directional gesture. If an object 210 is being targeted by the directional gesture when the trigger event is received by the information assistant 100, then the method 800 proceeds to step 830.

At step 830, the information assistant 100 acquires sensor data associated with the object of interest 210 being targeted by the directional gesture. The information assistant 100 may acquire sensor data via one or more I/O devices, microphones 114, and/or cameras 120. For example, and without limitation, as described above, the information assistant 100 may acquire image data, depth data, and/or audio samples via one or more image sensors, depth sensors, and/or auditory sensors. Additionally, the information assistant 100 may acquire sensor data via one or more I/O devices, such as radiofrequency (RF) sensors, spectrometers, sensor arrays, tomographic sensors, and the like.

Then, at step 840, the processing unit 102 analyzes one or more types of sensor data associated with the object of interest 210 to determine at least one characteristic of the object of interest 210. In various embodiments, the processing unit 102 analyzes sensor data according to any of the techniques described above in conjunction with FIGS. 1-7, including, for example and without limitation, analyzing one or more types of sensor data (e.g., both a first type of sensor data and a second type of sensor) acquired from one or more image sensors (e.g., a visible light sensor, infrared sensor, etc.), depth sensors, auditory sensors, RF sensors, spectrometers, sensor arrays (e.g., molecular sensors, chemosensors, etc.), and/or tomographic sensors.

In some embodiments, at least a portion of the sensor data associated with the object of interest 210 is analyzed locally by the information assistant 100. In the same or other embodiments, some or all of the sensor data associated with the object of interest 210 may be transmitted to a remote server and analyzed remotely. The results of the analysis may then be transmitted back to the information assistant 100. Additionally, as described above, a single characteristic of an object of interest 210 may be determined based on analyzing a first type of sensor data in conjunction with one or more other types of sensor data.

At step 850, the information assistant 100 presents the at least one characteristic of the object of interest 210 (e.g., identity, type, composition, etc.) to the user. For example, and without limitation, the at least one characteristic of the object of interest 210 may be presented to the user via the speaker 112, an I/O device, a display, and the like. The method 800 then ends.

Figure 9:
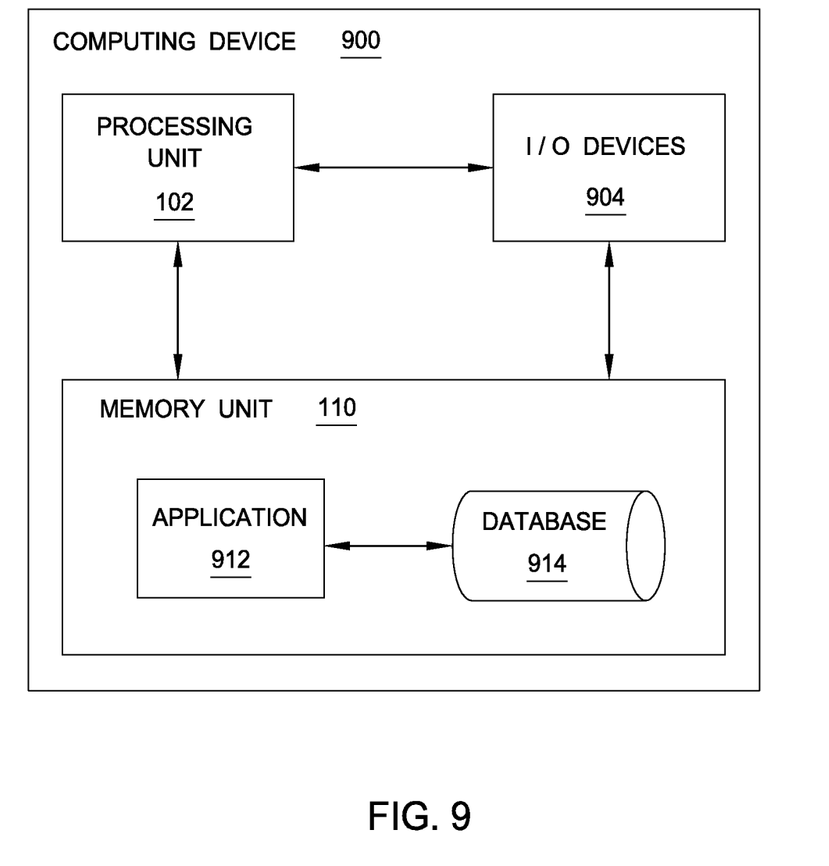
FIG. 9 is a block diagram of a computing device that may be implemented in conjunction with the information assistant of FIG. 1, according to various embodiments.

FIG. 9 is a block diagram of a computing device that may be implemented in conjunction with the information assistant 100 of FIG. 1, according to various embodiments. As shown, computing device 900 includes the processing unit 102, one or more input/output (I/O) devices 904 (e.g., image sensors, depth sensors, auditory sensors, RF sensors, spectrometers, sensor arrays, tomographic sensors, etc.), and a memory device 110. Memory device 110 includes an application 912 configured to interact with one or more databases 914.

Processing unit 102 may include a central processing unit (CPU), digital signal processing unit (DSP), and so forth. I/O devices 904 may include input devices, output devices, and devices capable of both receiving input and providing output. Memory device 110 may include a memory module or collection of memory modules. Software application 912 within memory device 110 may be executed by processing unit 102 to implement the overall functionality of computing device 900, and, thus, to coordinate the operation of the information assistant 100 as a whole. These operations include, without limitation, the various techniques discussed above in conjunction with FIGS. 1-7 and the flow diagram of FIG. 8. The database(s) 914 may store data that enables the information assistant 100 to identify directional gestures and trigger events as well as data that enables the information assistant 100 to provide information about an object of interest 100 to a user (e.g., image and/or sound recognition algorithms, a local knowledge base, a local copy of Wikipedia™, etc.).

Computing device 900 as a whole may be a microprocessor, an application-specific integrated circuit (ASIC), a system-on-a-chip (SoC), a mobile computing device such as a tablet computer or cell phone, a media player, and so forth. Generally, computing device 900 is configured to coordinate the overall operation of the information assistant 100. Any technically feasible system configured to implement the functionality of the information assistant 100 falls within the scope of the present invention.

In sum, the information assistant 100 determines that the user is targeting an object of interest 100 (e.g., via a directional gesture). If the information assistant 100 receives a trigger event while the object of interest 210 is being targeted, then data associated with the object of interest 210 is acquired by the information assistant. The information assistant 100 then analyzes the acquired data to determine at least one characteristic of the object of interest 210 and provides the at least one characteristic to the user.

At least one advantage of the techniques described herein is that the user is able to acquire specific information about objects located in the user's environment. Additionally, the user is able to acquire information about objects that the user cannot accurately identify, such as objects that do not have an official name, objects that may be referred to by multiple names, and/or objects which are difficult to precisely describe. Further, the disclosed techniques enable the user to acquire information about an object using convenient voice prompts, gestures, and/or other types of triggers.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of I/O devices that may acquire data associated with an object of interest, persons skilled in the art will appreciate that the systems and techniques described herein are applicable to other types of I/O devices. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A method for identifying a characteristic of an object, the method comprising:
    receiving, via a microphone, a directional voice prompt;
    determining, via a processor, that the object is a target of a directional gesture based on the directional voice prompt;
    detecting, via the processor, at least one of a trigger gesture and a voice trigger that occurs while the object is the target of the directional gesture;
    in response to the at least one of the trigger gesture and the voice trigger, acquiring sensor data associated with the object via one or more sensors;
    analyzing the sensor data via the processor to identify at least one characteristic of the object; and
    transmitting information associated with the at least one characteristic to an output device.

2. The method of claim 1, wherein detecting the trigger gesture comprises detecting a body gesture.

3. The method of claim 1, wherein detecting the voice trigger comprises detecting a voice prompt.

4. The method of claim 1, wherein the sensor data comprises at least one of image data and acoustic data.

5. The method of claim 1, wherein the database comprises a remote database, and the information about the object is received from the remote database via a wireless communication device.

6. The method of claim 1, wherein determining that the object is the target of the directional gesture comprises analyzing image data to determine that the object is intersected by a direction of the directional voice prompt.

7. The method of claim 1, wherein the directional voice prompt comprises at least one of a direction, a compass heading, an angular position, and a clockwise position.

8. A system for providing information about an object, the system comprising:
    a microphone configured to receive a directional voice prompt; and
    a processor coupled to the microphone and configured to:
        determine, based on the directional voice prompt, that the object is a target of a directional gesture;
        in response to determining that the object is the target of the directional gesture, acquire data associated with the object;
        identify the object based on the data; and
        transmit information associated with the object to at least one output device.

9. The system of claim 8, wherein the data associated with the object comprises at least one of image data and depth data.

10. The system of claim 8, wherein determining that the object is the target of the directional gesture comprises analyzing image data to determine that the object is intersected by a direction of the directional voice prompt.

11. The system of claim 8, wherein the directional voice prompt comprises at least one of a direction, a compass heading, an angular position, and a clockwise position.

12. A non-transitory computer-readable storage medium including instructions that, when executed by a processor, cause the processor to provide information about an object, by performing the steps of:
    receiving, via a microphone, a directional gesture that comprises at least a directional voice prompt;
    determining, based on the directional voice prompt, that the object is a target of the directional gesture;
    in response to determining that the object is the target of the directional gesture, acquiring data associated with the object;
    identifying the object based on the data; and
    transmitting information associated with the object to at least one output device.

13. The non-transitory computer-readable storage medium of claim 12, wherein the data associated with the object comprises at least one of image data and depth data.

14. The non-transitory computer-readable storage medium of claim 12, wherein determining that the object is the target of the directional gesture comprises analyzing image data to determine that the object is intersected by a direction of the directional voice prompt.

15. The non-transitory computer-readable storage medium of claim 12, wherein the directional voice prompt comprises at least one of a direction, a compass heading, an angular position, and a clockwise position.

16. A system for providing information about an object, comprising:
   a memory storing a database;
   a processor coupled to the memory, the processor configured to:
      determine that the object is a target of a directional gesture;
      detect a trigger event that occurs while the object is the target of the directional gesture;
      in response to detecting the trigger event, compare a direction associated with the directional gesture to cached geographical data to identify the object, wherein the cached geographical data is accessed via at least one of the database and a remote database; and
      transmit information associated with the object to at least one output device.

17. The system of claim 16, wherein the plurality of sensors comprises an image sensor and a microphone, the first type of sensor data comprises image data, and the second type of sensor data comprises an audio sample.

18. The system of claim 16, further comprising a camera coupled to the processor and configured to acquire one or more images, wherein the processor is configured to detect the trigger event by analyzing the one or more images to detect at least one of a hand gesture, an arm gesture, and a facial gesture.

19. The system of claim 16, wherein the plurality of sensors comprises a camera configured to acquire one or more images, and the processor is configured to determine the direction associated with the directional gesture by analyzing the one or more images to determine a hand direction.

20. The system of claim 16, wherein the plurality of sensors comprises a camera configured to acquire one or more images, and the processor is configured to determine the direction associated with the directional gesture by analyzing the one or more images to determine an eye gaze direction of the user.

21. The system of claim 16, further comprising at least one of an accelerometer and a gyroscope coupled to the processor, wherein the processor is configured to determine the direction associated with the directional gesture based on orientation data received from the at least one of the accelerometer and the gyroscope.

22. A non-transitory computer-readable storage medium including instructions that, when executed by a processor, cause the processor to provide information about an object, by performing the steps of:
   determining, based on first sensor data acquired via one or more first sensors, that the object is a target of a directional gesture;
   detecting a trigger event that occurs while the object is the target of the directional gesture;
   in response to detecting the trigger event, comparing a direction associated with the directional gesture to cached geographical data to identify the object, wherein the cached geographical data is accessed via at least one of the database and a remote database; and
   transmitting information associated with the object to at least one output device.

* * * * *